Nov. 10, 1959
C. H. NORDELL
2,912,266
VALVE STEM SEAL
Filed June 20, 1955
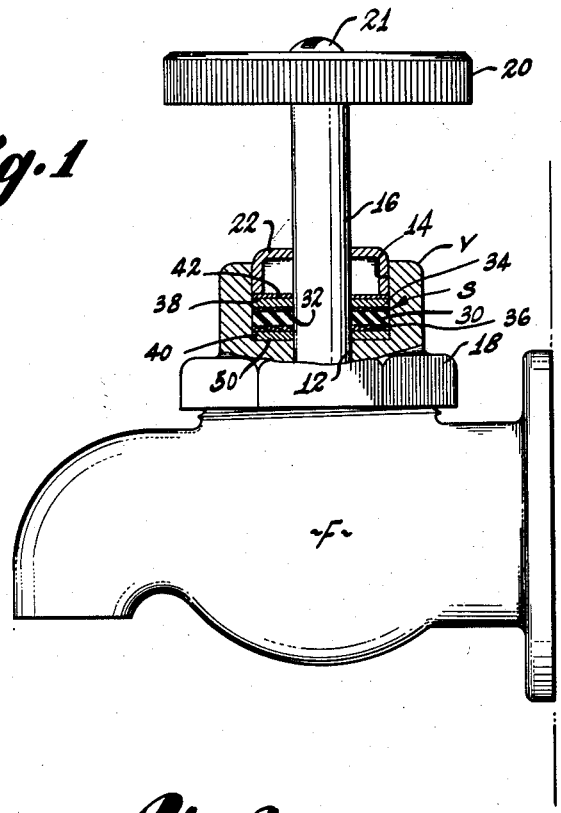
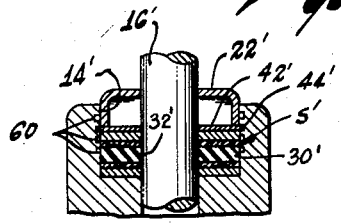
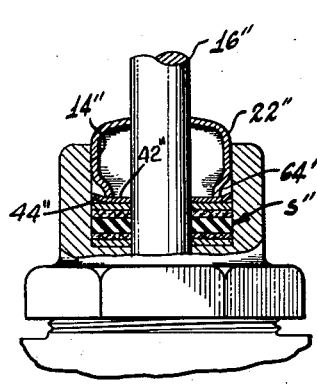
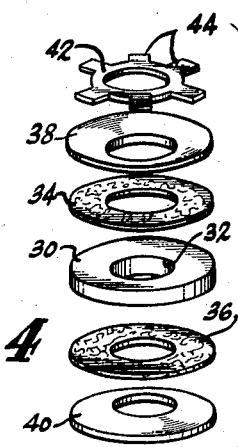
INVENTOR.
CARL H. NORDELL
BY
Attorneys

United States Patent Office 2,912,266
Patented Nov. 10, 1959

2,912,266

VALVE STEM SEAL

Carl H. Nordell, Palm Springs, Calif.

Application June 20, 1955, Serial No. 516,519

9 Claims. (Cl. 286—31)

The present invention relates generally to valves and more particularly to a novel seal for use in sealing a valve stem against outward leakage of fluid.

The majority of the commonly employed valve stem seals, as for example those used in domestic water faucets, are prone to permit leakage after a comparatively short duration of service life. It is then necessary to replace such seals. The replacement operation is generally both time-consuming and disagreeable, and if performed by a professional plumber may be comparatively costly.

It is a major object of the present invention to provide a new and improved valve stem seal which will afford a much longer service life than conventional heretofore-proposed seals of this type.

Another object is to provide a valve stem seal which requires much less space within the valve body than heretofore-proposed valve stem seals.

A further object of the invention is to provide a valve stem seal of the aforedescribed nature that will remain leakproof throughout its service life.

An additional object is to provide a valve stem seal which is extremely economical of construction whereby it may be sold at a comparatively low cost.

A further object is to provide a valve stem seal which under normal operating conditions does not require further attention once it has been installed.

It is another object of the invention to provide a valve stem seal of the aforedescribed nature which is both simple and compact in design, and is light in weight.

These and other objects and advantages of the present invention will become apparent from the following detailed description, when taken in conjunction with the appended drawings, wherein:

Figure 1 is a side elevational view of a conventional water faucet wherein is mounted a preferred form of valve stem seal embodying the present invention, such seal being shown in central vertical section;

Figure 2 is a central vertical sectional view of an alternate embodiment of said valve stem seal;

Figure 3 is a vertically exploded view of the parts of the valve stem seal shown in Fig. 1; and Figure 4 is a central vertical sectional view of yet another embodiment of said valve stem seal.

Referring to the drawings and particularly Figure 1 thereof, there is shown a conventional water faucet F having a valve body V wherein is disposed a preferred form of valve stem seal S embodying the present invention. The valve body V is formed with a vertical bore 12 and a coaxial cavity of larger diameter 14 forming an upward continuation of said bore. A cylindrical valve stem 16 extends coaxially upwardly through the bore 12 and the cavity 14. The valve body V is removably secured to the upper portion of the faucet F by means of a nut element 18. A handle 20 is secured to the upper end of the valve stem 16 by a bolt 21 and a suitable valve element (not shown) is operatively connected to the lower end of the valve stem 16. A cylindrical cover 22 serves to close the upper end of the cavity 14. The seal S is adapted to prevent the leakage of liquid upwardly through the bore 12 and cavity 14 from the interior of the faucet F.

The seal S includes a main sealing element in the form of a thin membrane or disc 30 which is formed with a central opening 32 originally of substantially the same diameter as the valve stem 16. The outside diameter of this disc 30 is originally substantially equal to the inner diameter of the cavity 14. The disc 30 is backed on both of its sides by washers 34 and 36 which are preferably of substantially the same size as the disc but which are formed of felt, or a similar fibrous material. Disposed axially outwardly from each of the felt washers 34 and 36 is a metallic cone-type spring washer 38 and 40. The latter are substantially the same size as the felt washers 34 and 36. Disposed above the upper cone-type spring washer 38 is a metallic retainer ring 42 having its outer portion formed with a plurality of circumferentially-spaced spur elements 44. These spur elements 44 engage the walls of the cavity 14 so as to permit the retainer ring to be moved axially downwardly relative to this cavity while restraining the retainer ring against upward axial movement relative to the cavity since any such upward axial movement will cause the angularly disposed spur elements 44 to scrape and dig into the walls and halt movement of the retainer ring in such direction.

The aforedescribed seal S is installed by forcing its six elements downwardly into the cavity 14 along the valve stem 16 by a suitable tool. At this time the handle 20 The aforedescribed seal is installed by forcing its six will not be attached to the stem, nor is the cover 22 positioned within the cavity. As downward movement of the seal elements continues the lower cone spring 40 will abut the blind end 50 of the cavity 14. When continued downward force is applied against the retainer ring 42, both of the cone springs 38 and 40 will be compressed. Thereafter, the retainer ring 42 will restrain the upper cone spring 38 against return upward movement. The compressed cone springs 38 and 40 will thereafter continue to apply a squeezing force against the felt washers 34 and 36 tending to compress the sealing disc 30 and thereby cause it to expand radially inwardly and outwardly. In this manner the edges of the central opening 32 of the disc will be urged into sealing engagement with the valve stem 16 while the outer peripheral edge of the disc will simultaneously be urged radially outwardly into sealing engagement with the walls of the cavity 14.

Preferably, the sealing disc 30 will be formed of a natural or synthetic rubber having good plastic flow characteristics. When this is the case, as the edges of the central opening 32 are worn away by movement of the valve stem 16, the material of the disc 30 will undergo radially inward plastic flow. Such plastic flow should take place at a minimum rate equal to that at which the disc material is worn away. Control of the rate of such plastic flow may be afforded by proper selection of the seal disc material, the strength characteristics of the two cone-type spring washers 38 and 40 and the depth to which the retainer ring 42 is urged downwardly within the cavity 14. The felt washers 34 and 36 serve as slip-inducing means between the spring washers 38 and 40 and the upper and lower faces of the sealing disc 30. This is true because the felt washers have a lower coefficient of friction relative to the sealing disc 30 than do the metallic spring washers. It may prove desirable in some instances to impregnate the slip-inducing washers 34 and 36 with some form of lubricant. As shown herein, the sealing disc 30 is disposed between the partially compressed spring washers 38 and 40 with the retainer ring 42 maintaining the spring washers partially compressed. The felt washers 34 and 36 serve as slip-inducing means between the spring washers 38 and 40 and the upper and lower faces of the sealing disc 30. With this arrangement, as the edges of the sealing disc's central opening 32 are worn away by movement of the valve stem 16, the material of the sealing disc will undergo radially inward plastic flow and the volume of the sealing disc will be gradually reduced by such plastic flow. In this manner, a maximum service life will be provided by the seal.

Under normal operating conditions the aforedescribed preferred form of seal S will remain effective throughout the useful life of the valve. Under severe conditions of operation, however, the seal may ultimately commence to leak. Should this occur the cover 22 may be removed and the retainer ring 42 urged downwardly to a lower position than that at which it was originally positioned.

Referring to Figure 2 there is shown an alternate embodiment of the preferred form of valve stem seal S described hereinabove. This embodiment S' is especially adapted for use where higher liquid pressures prevail. In this embodiment the walls of the cavity 14' are formed with a plurality of axially-spaced circumferential grooves 60. These grooves are adapted to receive the spur elements 44' of the retainer ring 42'. The seating of these spur elements 44' within the circumferential grooves 60 affords positive anchoring of the retainer ring 42'. The utilization of a plurality of annular grooves permits the retainer ring 42' to be successively lowered relative to the cavity 14' in order to compensate for the loss of volume of the sealing disc 30' as the edges of its central opening 32' are worn away and replaced by plastic flow of the material from which the disc is fabricated.

Referring now to Figure 4, there is shown another embodiment of the preferred form of valve seal S described hereinabove. This embodiment S'' is substantially identical to the form shown in Figure 1 except that it incorporates a different type of cover 22'' for the upper end of the cavity 14''. This cover 22'' is formed with a radially inwardly-necked lower portion designated 64. The lower end of this necked portion 64 engages the upper surface of the retainer ring 42'' at a point spaced inwardly from the spur elements 44''. With this arrangement, the cover 22'' may be disposed within the cavity 14'' and then employed to force the retainer ring 42'' and the other elements of the seal S'' downwardly into sealing position. This arrangement likewise makes it possible to employ the cover 22'' for applying a downward force to the retainer ring 42'' at any time during the life of the seal when such action may become necessary in order to prevent leakage.

It will be apparent that various modifications and changes may be made with regard to the foregoing detailed description without departing from the spirit of the present invention or the scope of the following claims.

I claim:

1. A seal for use between a cylindrical open-ended valve body cavity and a cylindrical valve stem that extends through said cavity comprising: an impervious elastic sealing disc formed with an opening of substantially the same diameter as said valve stem and having an outer diameter substantially equal to that of said cavity, said sealing disc being made of a material capable of undergoing radially inward plastic flow at a rate equal to that which is worn away by the movement of said valve stem; a cone-type spring washer disposed on each side of said sealing disc for applying axial squeezing force thereon so as to cause it to expand radially outwardly and inwardly and thereby effect sealing of said valve stem and the inner wall of said cavity, slip-inducing means having a lower coefficient of friction than exists between said sealing disc and said spring washer interposed between each side of said disc and the adjacent spring washer and a metallic retainer ring disposed against the side of the cone washer remote from said inner wall and having its outer portion formed with a plurality of circumferentially spaced spur elements which frictionally engage the walls of said cavity, whereby said ring be forced axially toward said inner wall until said cone washers are compressed with said spur elements thereafter exerting sufficient frictional resistance against the walls of said cavity that said retainer ring is restrained against return axial movement.

2. A seal for use between a cylindrical open-ended valve body cavity and cylindrical stem that extends through said cavity comprising: an impervious elastic sealing disc formed with an opening of substantially the same diameter as said valve stem and having an outer diameter substantially equal to that of said cavity, said sealing disc being made of a material capable of undergoing radial inward plastic flow at a rate equal to that at which is worn away by movement of said valve stem; a cone-type spring washer disposed on each side of said sealing disc for applying an axial squeezing force thereon so as to cause it to expand radially outwardly and inwardly and thereby effect sealing of said valve stem and the inner wall of said cavity; slip inducing means having a lower coefficient of friction than that existing between said sealing disk and spring washers interposed between each side of said disc and the adjacent spring washer; a plurality of axially-spaced circumferential grooves formed in said body cavity; and a metallic retainer ring disposed against the side of the cone washer remote from the inner wall of said cavity and having its radially outer portion disposed within one of said grooves whereby said retainer ring will be restrained against axial movement away from said inner wall.

3. A seal as set forth in claim 1 where said slip-inducing means are formed of a fibrous material.

4. A seal as set forth in claim 3 where said slip-inducing means are felt washers.

5. A seal for use between a cylindrical open-ended valve body cavity and a cylindrical valve stem that extends through said cavity comprising: an impervious elastic sealing disc formed with an opening of substantially the same diameter as said valve stem and having an outer diameter substantially equal to that of said cavity; a cone-type spring washer disposed on each side of said sealing disc for applying an axial squeezing force thereon so as to cause it to expand radially outwardly and inwardly and thereby effect sealing of said valve stem and the inner wall of said cavity; a metallic retainer ring disposed against the side of the cone washer remote from said inner wall and having its outer portion formed with a plurality of circumferentially-spaced angularly disposed spur elements which frictionally engage walls of said cavity whereby said ring may be forced axially toward said inner wall until said cone washers are compressed with said elements thereafter exerting sufficient frictional resistance against the walls of said cavity that said retainer ring is restrained against return axial movement; and, a generally cylindrical cover for said body cavity having an upper portion axially slidably disposed in said body cavity and a radially inwardly-necked end portion which engages said retainer ring at a point spaced radially inwardly from said spur elements whereby it will apply an axial force to said retainer ring when said cover is urged toward the inner wall of said cavity.

6. A seal as set forth in claim 5 where slip-inducing means having a lower coefficient of friction than that existing between said sealing disc and said spring washers are interposed between each side of said disc and the adjacent spring washer.

7. A seal as set forth in claim 6 where said slip-inducing means are felt washers.

8. A seal as set forth in claim 2 where said slip-inducing means are formed of a fibrous material.

9. A seal as set forth in claim 2 where said slip-inducing means are felt washers.

(References on following page)

References Cited in the file of this patent

UNITED STATES PATENTS

| | | |
|---|---|---|
| 926,841 | Bartlett | July 6, 1909 |
| 1,191,137 | Powers | July 11, 1916 |
| 1,591,876 | Neal | July 6, 1926 |
| 2,113,098 | Skinner | Apr. 5, 1938 |
| 2,445,410 | Smith | July 20, 1948 |
| 2,468,924 | Courtier | May 3, 1949 |
| 2,587,405 | Stevens et al. | Feb. 26, 1952 |
| 2,646,959 | Carver | July 28, 1953 |
| 2,687,908 | Vorech | Aug. 31, 1954 |
| 2,794,662 | Reynolds | June 4, 1957 |

FOREIGN PATENTS

| | | |
|---|---|---|
| 1,774 | Great Britain | of 1892 |